United States Patent
Martis et al.

(10) Patent No.: US 9,273,614 B2
(45) Date of Patent: Mar. 1, 2016

(54) DETERMINATION OF A SIGNAL INDICATIVE OF SHAFT POWER

(75) Inventors: Dan Martis, Montreal-West (CA); Paul Fletcher, Warwickshire (GB); Betka Rebhi, Derby (GB); Vincent Perez, Montreal (CA); Robert Doke, Lasalle (CA)

(73) Assignee: INDUSTRIAL TURBINE COMPANY (UK) LIMITED, Frimley, Camberley (GB)

( * ) Notice: Subject to any disclaimer, the term of this patent is extended or adjusted under 35 U.S.C. 154(b) by 1998 days.

(21) Appl. No.: 11/514,766

(22) Filed: Sep. 1, 2006

(65) Prior Publication Data

US 2007/0125090 A1 Jun. 7, 2007

Related U.S. Application Data

(60) Provisional application No. 60/716,605, filed on Sep. 12, 2005.

(51) Int. Cl.
*F02C 1/00* (2006.01)
*F02C 9/54* (2006.01)
*F02C 9/28* (2006.01)

(52) U.S. Cl.
CPC ... *F02C 9/54* (2013.01); *F02C 9/28* (2013.01); *F05D 2260/80* (2013.01); *F05D 2270/02* (2013.01); *F05D 2270/304* (2013.01)

(58) Field of Classification Search
CPC ............... F02C 9/28; F05B 2270/304; F05B 2270/103; F05B 2270/335
USPC .......................................... 60/39.27, 773, 794
See application file for complete search history.

(56) References Cited

U.S. PATENT DOCUMENTS

| | | | |
|---|---|---|---|
| 4,581,888 A * | 4/1986 | Schmitzer et al. | 60/39.091 |
| 4,693,077 A * | 9/1987 | Skarvan et al. | 60/39.282 |
| 5,078,345 A * | 1/1992 | DeVries et al. | 244/182 |
| 5,744,723 A | 4/1998 | Piety | |
| 5,775,089 A | 7/1998 | Skarvan | |
| 5,775,090 A | 7/1998 | Skarvan | |
| 6,364,602 B1 * | 4/2002 | Andrew et al. | 415/1 |
| 6,393,355 B1 | 5/2002 | Muramatsu | |
| 6,748,744 B2 | 6/2004 | Peplow et al. | |
| 6,768,938 B2 | 7/2004 | McBrien et al. | |
| 6,820,429 B2 * | 11/2004 | Meisner | 60/773 |
| 6,823,675 B2 | 11/2004 | Brunell et al. | |
| 2001/0000090 A1 | 4/2001 | Thompson et al. | |
| 2001/0049574 A1 | 12/2001 | Taniguchi et al. | |
| 2003/0027686 A1 | 2/2003 | Shibata et al. | |
| 2003/0126862 A1 | 7/2003 | Peplow et al. | |
| 2004/0030417 A1 | 2/2004 | Gribble et al. | |
| 2004/0123600 A1 | 7/2004 | Brunell et al. | |
| 2004/0154385 A1 * | 8/2004 | Acker | 73/116 |
| 2005/0028530 A1 | 2/2005 | Doebbeling et al. | |
| 2006/0010876 A1 * | 1/2006 | Hoffmann et al. | 60/773 |
| 2006/0201132 A1 * | 9/2006 | Hirayama et al. | 60/39.27 |

* cited by examiner

*Primary Examiner* — Gerald L Sung
(74) *Attorney, Agent, or Firm* — Beusse Wolter Sanks & Maire

(57) ABSTRACT

A gas turbine engine provides mechanical shaft power. Two parameters relating to engine operation are sensed that are representative of two different pressures, two different temperatures, or a pressure and a temperature associated with the engine. A value representative of the shaft power is determined during engine operation as a function of these two parameters. This value may be used for engine monitoring including making one or more adjustments to operational aspects of the engine, regulating/controlling engine function, and/or providing one or more power indicators.

11 Claims, 2 Drawing Sheets

DETERMINATION OF A SIGNAL INDICATIVE OF SHAFT POWER

CROSS-REFERENCE TO RELATED APPLICATIONS

The present application claims the benefit of U.S. Provisional Patent Application 60/716,605 filed on 12 Sep. 2005, which is hereby incorporated by reference in its entirety.

BACKGROUND

The present invention relates to gas turbine engine operation, and more particularly, but not exclusively relates to determining a control system value representative of rotational shaft power.

For gas turbine engines primarily dedicated to the supply of mechanical power through a rotating shaft, it is sometimes desired to control one or more aspects of engine operation based on shaft power output. Unfortunately, for at least some of these situations, direct sensing of the power generated by a rotating shaft is impractical and/or is not cost-effective. Thus, there is an ongoing demand for further contributions in this area of technology.

SUMMARY

One embodiment of the present invention includes a unique technique to determine a value indicative of shaft power of a gas turbine engine. Other embodiments include unique apparatus, devices, systems, and methods to control a gas turbine engine with a value representative of shaft power. Further embodiments, forms, objects, features, advantages, aspects, and benefits of the present application shall become apparent from the detailed description and drawings included herein.

DETAILED DESCRIPTION OF SELECTED EMBODIMENTS

Figure 1:
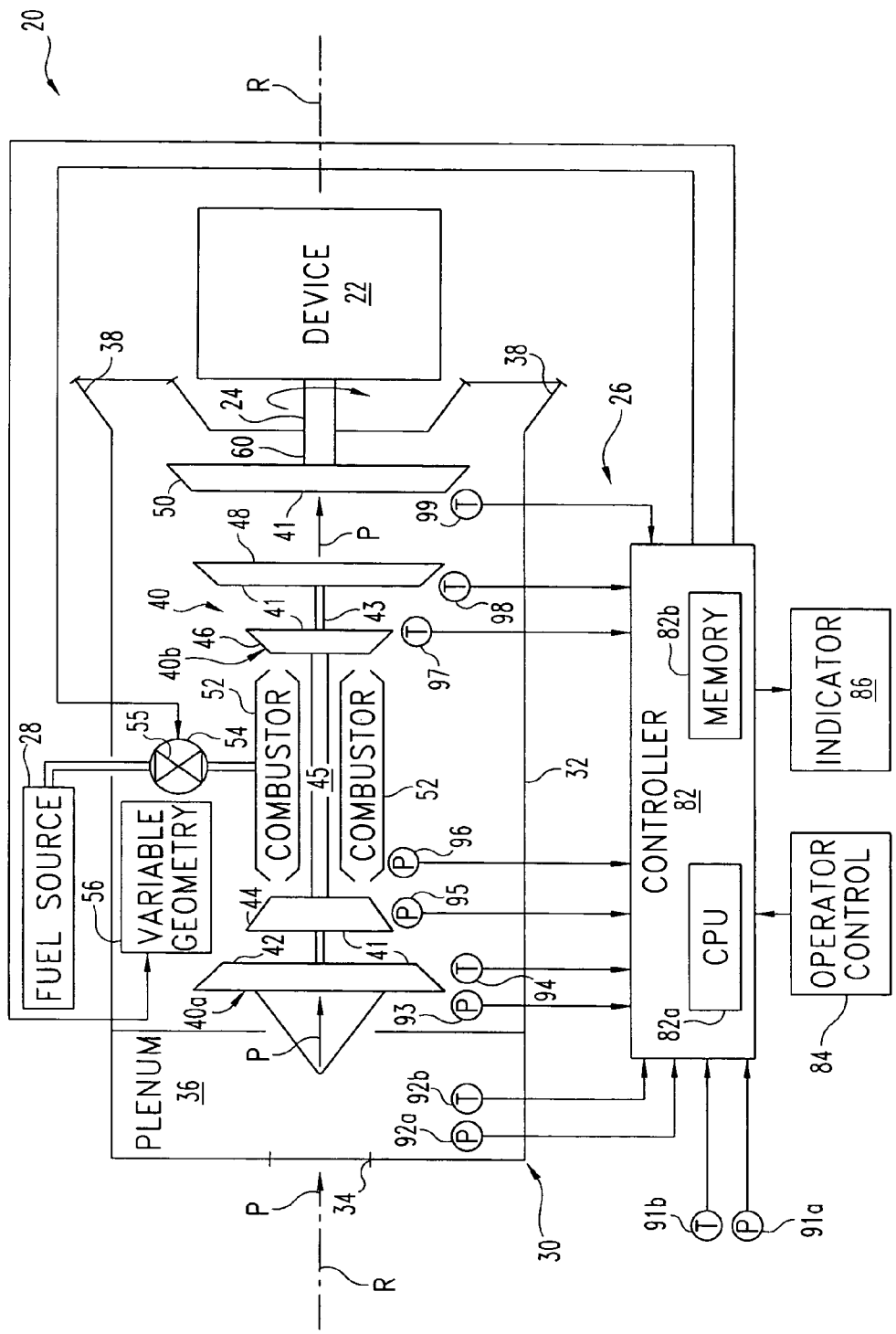
FIG. 1 is a partial, diagrammatic view of a gas turbine engine system.

While the present invention can take many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications of the described embodiments, and any further applications of the principles of the invention as described herein are contemplated as would normally occur to one skilled in the art to which the invention relates.

One embodiment of the present invention is a gas turbine engine with a rotatable shaft structured to deliver mechanical power. A signal corresponding to shaft power is sensed based on one or more pressures and/or one or more temperatures associated with the engine. This signal can be provided as a value determined with a processing device. The signal may be used to monitor the engine, including the provision of a shaft power indicator and/or the provision of an engine control input. In one nonlimiting form, a ratio of two pressures within the engine is used to provide a signal corresponding to shaft power, and a ratio of two temperatures associated with the engine provides a correction factor that at least partially accounts for engine-to-engine variation from engine wear, aging, fouling, intolerance differences, and the like. The engine may be utilized to power any of a number of devices such as land vehicles, marine vehicles, pumps, and/or electric power generators, just to name a few possibilities.

FIG. 1 illustrates a gas turbine engine system 20 of another embodiment of the present application. System 20 includes a device 22 that receives mechanical power from a rotating shaft 24. System 20 further includes gas turbine engine equipment 26. Shaft 24 mechanically couples the device 22 to the gas turbine engine equipment 26, and provides rotational power to the device 22. Shaft 24 can be directly mechanically connected to the device 22 or can be coupled through one or more gear boxes, clutches, torque converters, transmissions, or a different mechanical linkage as would occur to those skilled in the art. The specific implementation of the shaft coupling typically varies with the nature of the device 22.

The equipment 26 includes an engine fuel source 28 and a gas turbine engine 30. The engine 30 is at least partially enclosed in a housing 32. Engine 30 includes an air inlet 34 (schematically depicted) into an engine plenum 36. Engine 30 defines a working fluid flow path P as symbolized by like-labeled arrows in FIG. 1. Working fluid flow path P flows from the inlet 34 of engine 30 to a working fluid discharge outlet 38 (also schematically depicted).

The engine 30 includes turbomachinery 40 that comprises a number of rotors 41 connected to a respective shaft to turn about rotational axis R. More specifically, engine 30 includes a dual spool arrangement with a low pressure spool 40a and a high pressure spool 40b. The spool 40a includes a low pressure compressor 42 connected to turn with a shaft 43 about axis R. A turbine 48 is also connected to the shaft 43 to turn about axis R with the compressor 42. The spool 40b includes high pressure compressor 44 connected to turn with a shaft 45 about axis R. A turbine 46 is also connected to the shaft 45 to turn about axis R in concert with the compressor 44. The shaft 43 extends from the compressor 42 to the turbine 48 along a passageway that coaxially extends through shaft 45 so that the spool 40a and the spool 40b can rotate about axis R independent of one another.

Positioned between the compressor 44 and turbine 46 are combustors 52 of engine 30, which are schematically illustrated. A fuel control device 54 in the form of a controllable fuel value 55 regulates fuel provided to the combustors 52 from the engine fuel source 28. Engine 30 also includes a Controllable Variable Geometry (CVG) mechanism 56 comprised of actuator-adjusted stators, bleed valves, and/or such different elements as would occur to those skilled in the art to provide a standard CVG system.

The engine 30 also includes a free power turbine 50 that is downstream of the turbine 48 along the working fluid flow path P. The free power turbine 50 is fixed to the shaft 24. The free power turbine 50 is driven by working fluid impinging on it along path P before it exits through the outlet 38, which in response turns the shaft 24 and correspondingly provides rotational power to the device 22. In application, device 22 can be of any type. In one common form, device 22 is a stationary electric power generator that is driven by the mechanical power provided by power shaft 24. In another application, device 22 corresponds to a vehicle that carries equipment 26, such as a land vehicle or a marine vehicle. In still other embodiments, device 22 may differ as would occur to those skilled in the art.

Working fluid sufficient to drive the free power turbine 50 in this manner is provided through standard gas turbine engine operation. Generally, air is drawn through the inlet 34, which is then compressed by the low pressure compressor 42. The pressurized discharge of the low pressure compressor 42 is further pressurized by the high pressure compressor 44, which then discharges the working fluid at high pressure to the combustors 52. Fuel is introduced into the working fluid discharged by the high pressure compressor 44, and ignited within the combustors 52. The expanding gases resulting from this combustion are discharged by the combustors 52 at the inlet to the turbine 46. In response, the turbine 46 is rotated and correspondingly the shaft 45 rotates, which turns the high pressure compressor 44 to provide a persistent stabilized operation of the spool 40b. The working fluid discharged from the turbine 46 flows along path P to the inlet of the turbine 48. The impinging working fluid turns the turbine 48 in a manner like the turbine 46, causing the shaft 43 to rotate and correspondingly turning the low pressure compressor 42. In this manner, the rotation of the compressors 42 and 44 is continued by the operation of the combusted working fluid that drives the respective turbines 46 and 48. As the working fluid is discharged from the turbine 48, the free power turbine 50 is encountered. In response, the free power turbine 50 rotates and correspondingly turns the shaft 24 to provide rotational mechanical power to the device 22, as previously described.

To regulate the operation of the gas turbine engine 30, a controller 82 is provided. The controller 82 includes a central processing unit 82a and a memory 82b, and may include other features such as limiters, conditioners, filters, format converters, or the like which are not shown to preserve clarity. An operator input control 84 is coupled to the controller 82 to provide a corresponding operator input signal. This input signal can be representative of an operating set point, such as a throttle setting, or the like. An indicator 86 is also coupled to the controller 82 that is responsive to an indicator output signal from the controller 82. The controller 82 is comprised of one or more components that may be configured as a single unit, or distributed among two or more units. The processing unit 82a and/or the memory 82b may be combined in a common integrated circuit, defined by separate circuitry, or comprised of one or more other component types of a solid state, electromagnetic, optical, or different variety as would occur to those skilled in the art. The controller 82 may include analog circuitry, digital circuitry, and/or a hybrid combination of both of these types. In one form, the controller 82 is of the programmable variety that executes algorithms and processes data in accordance with operating logic that is defined by programming instructions (such as software or firmware). Alternatively or additionally, operating logic for controller 82 is at least partially defined by hardwired logic or other hardware. In one particular form, the controller 82 is configured to operate as a Full Authority Digital Engine Control (FADEC); however, in other embodiments it may be organized/configured in a different manner as would occur to those skilled in the art.

Also, coupled to the controller 82 are a number of sensor inputs. Several of these inputs are illustrated in FIG. 1 as pressure sensors, as generically denoted by a "P," or temperature sensors, as generically noted by a "T." More specifically, a pressure sensor 91a is coupled to the controller 82 to provide a pressure signal "Pamb" that corresponds to ambient pressure associated with the engine 30. A temperature sensor 91b is coupled to the controller 82 to provide temperature signal "Tamb" that corresponds to ambient temperature associated with the engine 30. Within plenum 36, a pressure sensor 92a provides a corresponding plenum pressure signal to the controller 82. A temperature 92b provides a plenum temperature signal to the controller 82. A pressure sensor 93 provides a signal to the controller 82 that corresponds to the pressure at the inlet of the low pressure compressor 42. Likewise, a temperature sensor 94 provides a temperature signal T20, which corresponds to an inlet temperature for the inlet of the low pressure compressor 42. A pressure sensor 95 provides a pressure signal P30 to the controller 82 that corresponds to the discharge pressure of the high pressure compressor 44. A pressure sensor 96 provides a signal to the controller 82 corresponding to the combustor entry pressure. A temperature sensor 97 provides a discharge temperature for the turbine 46. A temperature sensor 98 provides a signal to the controller 82 corresponding to the inlet temperature for the low pressure turbine 48, and a temperature sensor 99 provides a temperature signal T44 to controller 82 that corresponds to the inlet temperature for the free power turbine 50. The pressure measurements detected with pressure sensors 91a, 92a, 93, 95, and 96 are of a total type, a static type, or a combination of total and static types. The temperature measurements detected with temperature sensors 91b, 92b, 94, 97, 98, and 99 are of a total type; however, one or more static temperatures can be determined therefrom for use in addition or in the alternative.

In at least some situations, it is not feasible to directly detect the mechanical power output of shaft 24. Still, there are applications where it is desirable to have a measurement that can directly or indirectly represent shaft power. It has been surprisingly discovered that a power setting parameter, PSP, which is approximately proportional to shaft power, can be determined from other sensed variables according to the mathematical relationship of the following expressions (1) and (2):

$$\text{PSP} = f((\theta)^{A} * (P30/P\text{amb}) * (T44/T20)^{B}); \quad (1)$$

$$\theta = T20/T\text{ref}; \quad (2)$$

where: the variables Pamb, P30, T44 and T20 correspond to the sensed signals from the respective sensors 91a, 95, 99, and 94 previously described; A and B are experimentally-determined exponents (constant values) corresponding to engine design, and Tref is an arbitrary temperature reference value. Accordingly, it should be appreciated that the function $f$ given by expression (1) is determined for each engine type. In one form, Pamb is a static pressure reading, P30 is a total pressure reading, T44 is a total temperature reading, and T20 is total temperature reading.

It should be appreciated that PSP is related to corrected shaft power, PWSD, through the mathematical relationship of expressions (3) and (4) as follows:

$$\text{PSP} = PWSD/\delta; \quad (3)$$

$$\delta = (P\text{amb}/P\text{ref}); \quad (4)$$

where: Pref is an arbitrary pressure reference value. In one form, Tref and Pref are selected from ISO standards, such as the standard day temperature of 288.15 degrees Kelvin for Tref and standard sea level pressure of 14.7 psia for Pref. However, in other embodiments, it should be recognized that one or more of these arbitrary values can differ.

It should further be appreciated that the P30/Pamb ratio term of expression (1) is approximately proportional to the rotational power output of the power shaft 24 for a given set of conditions, and the T44/T20 ratio term typically provides a degree of compensation for engine-to-engine variation due to scattering, deterioration, wear, fouling, or the like; while θ typically provides a degree of compensation for the temperature measurement of signal T20. Correspondingly, the δ parameter compensates for Pamb with respect to expressions (3) and (4). As a result, relationships of expressions (1)-(4) account for ambient pressure and temperature conditions, and the determination of PSP in a manner corresponding to expression (1) also typically compensates for sensitivity to humidity and/or fuel composition variation.

Based on these relationships, it should be appreciated that a parameter corresponding to shaft power can be synthesized from other detected variables of the engine 30. For example, shaft power can be represented as a function of pressure and/or temperature. In one form corresponding to expression (1), a shaft power-indicative variable can be selected corresponding to the (P30/Pamb) ratio, with any desired compensating/correction terms corresponding to θ, the ratio T44/T20, or the like. In one even more particular form, Pamb is a static reading, and P30, T44, and T20 are total readings. With the sensed variables selected, such as the signals P30, Pamb, T20, and T44 of expression (1), the A and B design exponents are empirically determined for the given engine design. Once determined, the same A and B design constants can be used for engines of like design, absent a material change in design of engine 30 or the sensed variables used. For a given application, it may be desired that one or more measured variables instead be: approximated with a constant, replaced by a mathematical function, selected from a look-up table of values based on a different input parameter, provided by substitution with a different sensed parameter, and/or determined using different techniques as would occur to those skilled in the art.

With regard to substitution of one or more of the variable inputs by one or more others, it should be noted that the pressure signal P30, while derived from the pressure sensor 95, can alternatively be provided in the form of a total or static pressure reading at the combustor entry point with the pressure sensor 96. Furthermore, the pressure signal Pamb can be derived from engine plenum pressure detected with the pressure sensor 92a, or the low pressure compressor inlet total or static pressure determined with the pressure sensor 92b. In another example, the temperature signal T20 from the temperature sensor 94 can be substituted with a different total or static temperature such as the temperature signal Tamb determined with the temperature sensor 92b, or the engine plenum temperature determined with the temperature sensor 92b. In still another substitution, the temperature signal T44 can be replaced by the total or static low pressure turbine inlet temperature determined with the temperature sensor 98, the total or static discharge temperature from the turbine 46 as determined with the temperature sensor 97, or a static or total inlet temperature for turbine 50 as determined with the temperature sensor 99. In further embodiments other sensed parameter substitutions can be used in connection with one or more of expressions (1)-(4).

In still other embodiments, compensation with signals T44, T20, θ or the like may not be needed, or only some of these values are utilized. Further, for a given engine design, A and B are constants; however, in other embodiments, one or more of these may be replaced with a mathematical function, a value from a look-up table, or the like; and/or may depend on one or more other available parameters of the engine 30 to make the corresponding A or B selection.

Figure 2:
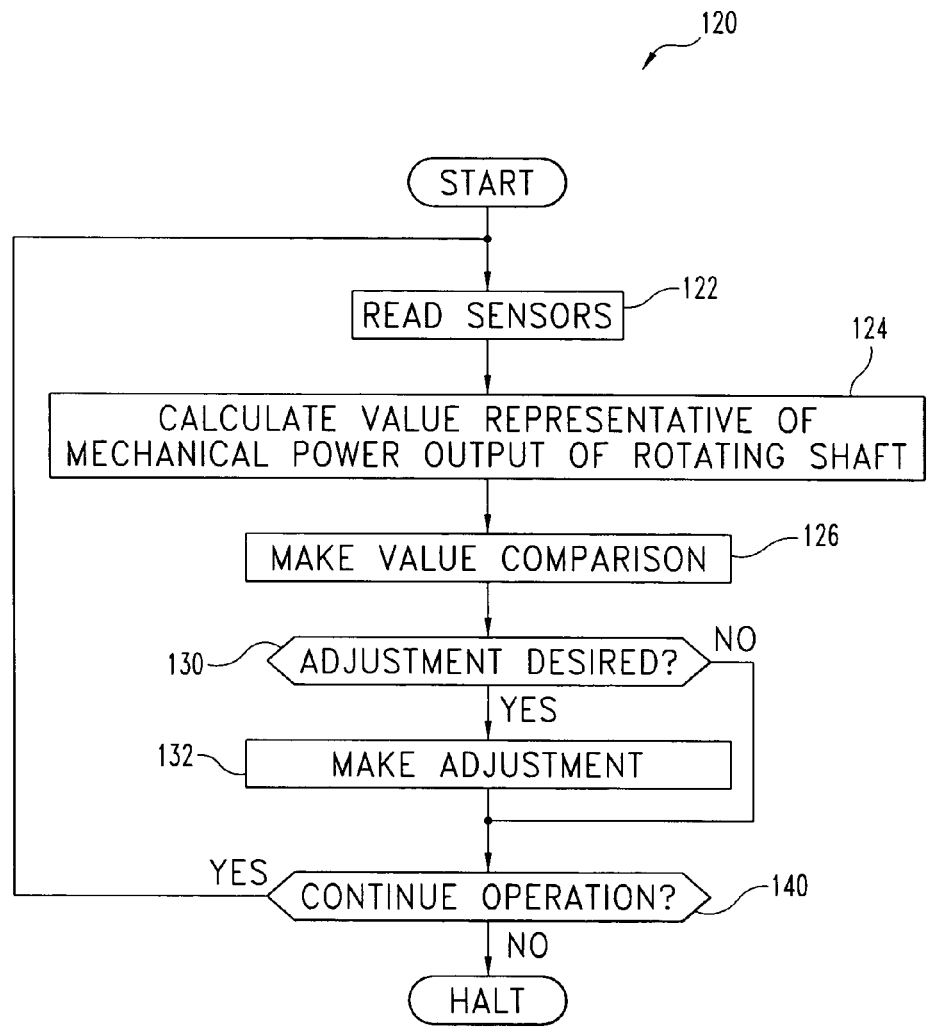
FIG. 2 is a flow chart corresponding to one mode of operation of the system of FIG. 1.

Referring additionally to FIG. 2, one mode of operating system 20 is described as a procedure 120. In the procedure 120, the corresponding sensors are read during operation 122 and are input to the controller 82. For the relationship of expression (1), these include the pressure sensor 91a to provide the pressure signal Pamb, the temperature sensor 94 to provide the low pressure compressor inlet temperature signal T20, the pressure sensor 95 to provide the high pressure compressor discharge pressure P30, and the temperature sensor 99 to provide the free power turbine inlet temperature signal T44.

The procedure 120 continues from the operation 122 with operation 124. In the operation 124, the value representative of mechanical power output, PSP, is calculated in accordance with expression (1) using the sensor readings from the operation 122. From the operation 124, the procedure 120 proceeds to operation 126. In the operation 126, the PSP value determined in the operation 124 is utilized in monitoring the operation of the engine 30.

Specifically, one or more comparisons of the calculated value, corresponding to a PSP signal, are made in the operation 126. The desire to make any adjustments in response to the comparison is tested by a conditional 130 that follows the operation 126. If the test of the conditional 130 is true (affirmative) then an adjustment is desired, and procedure 120 branches to operation 132 to make such adjustment. For example, adjustments of this nature may include adjusting the variable geometry mechanism 56 and/or adjusting the valve 55 of the device 54. If the test of the conditional 130 is false (negative)—that is no adjustment is desired, then the procedure 120 branches around the operation 132 and proceeds directly to a conditional 140. The operation 132 also advances to the conditional 140 whether an adjustment is made or not. The procedure 120 can include providing an operator an indication of shaft power setting or output via the indicator 86. In one form including such an indication, the comparison of the operation 126 can be performed by the operator with a selective adjustment being made by the operator with the operator control 84 in the operation 132. Indicator 86 can be of gauge-type, an LED read-out or other visual display, and/or an audio output, to name just a few possibilities.

The conditional 140 tests whether to continue the procedure 120. If the test of the conditional 140 is true (affirmative), then the procedure 120 loops back to read sensors again in the operation 122, and likewise repeat the operations 124 and 126, the conditional 130, and potentially the operation 132, (if the conditional 130 is true). If the test of the conditional 140 is false (negative), then the procedure 120 halts. Generally, the procedure 120 is repeated from time-to-time during the operation of the engine 30 until its operation ceases. For a digital form of the controller 82, such operation may be repeated on a synchronous, periodic basis. Alternatively or additionally, repetition may be governed by interrupt logic, conditional testing, variable timers, or the like.

Many other embodiments of the present invention are envisioned. In other embodiments, the arrangement of the engine 30 may differ. For example, only a single spool may be used, the shaft of which also drives device 22. In another alternative, the shaft of a high pressure spool of a dual spool arrangement is also the shaft providing output power to the device 22. In still another arrangement, more than two spools are used and the shaft to drive device 22 is the same as the shaft belonging to one of the spools or is mechanically linked thereto. In still other arrangements, more or fewer spools are used in connection with a free power turbine that provides the shaft output power.

In a further example, a gas turbine engine is structured to rotate a shaft to output mechanical power. A gas pressure within the engine is sensed during its operation and a value representative of this mechanical power is determined as a function of the gas pressure. Further, one or more different pressures may be utilized in this function. Alternatively or additionally, one or more temperatures associated with the engine may be utilized. The resulting value may be used to monitor engine operation, which can include providing an indication of shaft power and/or providing an input to control engine operation based on the value. Such operational control can include selectively adjusting a variable geometry mechanism, a fuel control device, or the like, just to name a few possibilities.

In another example, a gas turbine engine is structured to rotate a shaft to generate mechanical power, and includes: means for sensing a gas pressure within the engine during engine operation, means for determining a value representative of mechanical power provided by rotation of the shaft as a function of the gas pressure and a temperature, and means for controlling engine operation in accordance with this value.

Yet another example includes: operating a gas turbine engine with a rotatable shaft structured to provide mechanical shaft power, sensing a first gas pressure within the engine during this operation, determining a signal representative of the shaft power of the engine in accordance with a relationship between the first gas pressure and a second gas pressure, and performing one or more adjustments in response to this signal. Such adjustments could include changing an output indicator corresponding to the shaft power, adjusting one or more actuators associated with engine operation, or such different adjustment as would be appropriate.

A further example comprises a gas turbine engine with a rotatable shaft structured to output mechanical power that includes: means for sensing a first gas pressure within the engine during its operation, means for determining a value representative of the shaft power in accordance with a relationship between the first gas pressure and a second gas pressure, and means for performing one or more adjustments in response to this value.

Still a further example includes: providing a gas turbine engine structured to output mechanical shaft power, and sensing two parameters relating to engine operation that are representative of two different pressures, two different temperatures, or a pressure and a temperature associated with the engine. This example further includes determining a signal representative of the shaft power during engine operation as a function of the two parameters and monitoring the engine operation with this signal.

Another example includes: a gas turbine engine with one or more compressors, one or more turbines, and a shaft structured to rotate to provide an output of mechanical power. Also included is a first sensor operable to generate a first signal representative of a first parameter relating to operation of the engine and a second sensor operable to generate a second signal representative of a second parameter relating to the operation of the engine. The system further includes a controller responsive to the first and second signals to determine a controller signal representative of the shaft power. The controller calculates this controller signal as a function of the first and second parameters, where such parameters correspond to two different pressures, two different temperatures, or a temperature and a pressure associated with the engine. The controller determines one or more output signals in accordance with the controller signal and an output device is responsive to these one or more output signals.

Any theory, mechanism of operation, proof, or finding stated herein is meant to further enhance understanding of the present invention and is not intended to make the present invention in any way dependent upon such theory, mechanism of operation, proof, or finding. While the invention has been illustrated and described in detail in the drawings and foregoing description, the same is to be considered as illustrative and not restrictive in character, it being understood that only the selected embodiments have been shown and described and that all changes, modifications and equivalents that come within the spirit of the invention as defined herein or by any of the following claims are desired to be protected.

What is claimed is:

1. A method, comprising:
providing a gas turbine engine structured to rotate a shaft to generate mechanical power;
sensing a gas pressure of a working gas within the gas turbine engine during gas turbine engine operation;
determining a signal representative of a computed estimate of mechanical power provided by rotation of the shaft, the computed estimate formulated as a function of the gas pressure and a temperature, the temperature within the computed estimate used to compensate for gas turbine engine variation over time in the function; and
controlling the gas turbine engine operation in accordance with the signal;
wherein the function comprises the relationship $(T20/Tref)^A * (P30/Pamb)$, wherein
T20 represents a detected inlet temperature of a compressor of the gas turbine engine or an ambient temperature detected proximate the gas turbine engine or within a plenum of the gas turbine engine;
Tref represents a reference ambient temperature;
"A" represents an experimentally derived value corresponding to the gas turbine engine;
P30 represents the gas pressure detected at a discharge of a compressor of the gas turbine engine or at an entry of a combustor of the gas turbine engine; and
Pamb represents an ambient air pressure detected proximate the gas turbine engine or within a plenum of the gas turbine engine.

2. The method of claim 1, wherein the signal corresponds to a number, and further comprising:
detecting a turbine inlet temperature of the gas turbine engine; and
included in the determining of the signal, calculating the number from the function, the function including a further relationship $(T44/T20)^B$ as a factor of the function, wherein
T44 represents the detected turbine inlet temperature of the gas turbine engine;
"B" represents an experimentally derived value corresponding to the gas turbine engine; and
the further relationship being selected to correct for the gas turbine engine variation over time.

3. The method of claim 2, further comprising:
detecting the ambient pressure represented by Pamb; and
included in the determining of the signal, calculating the number from the function wherein the relationship (P30/Pamb) corresponds to an uncorrected mechanical power.

4. The method of claim 1, wherein the controlling of the gas turbine engine operation includes one or more of:
changing a variable geometry of the gas turbine engine in response to the signal;
adjusting a fuel control device of the gas turbine engine in response to the signal; and
indicating engine power output with an indicator responsive to the signal.

5. A method, comprising:
operating a gas turbine engine with a rotatable shaft structured to provide mechanical shaft power;
sensing a first gas pressure within the gas turbine engine during an operation of the gas turbine engine;

determining a value that approximates the shaft power of the gas turbine engine in accordance with a relationship between the first gas pressure and a second gas pressure; and in response to the value, performing one or more adjustments to alter the operation of the gas turbine engine;

wherein the relationship comprises P30/Pamb, wherein

P30 represents the first gas pressure and is detected at a discharge of a first compressor of the gas turbine engine or at an entry of a combustor of the gas turbine engine; and Pamb represents the second gas pressure and is an ambient air pressure detected proximate the gas turbine engine or within a plenum of the gas turbine engine.

6. The method of claim 5 further comprising:

detecting two temperatures represented by T44 and T20; wherein the relationship further comprises $(T44/T20)^B$ as a factor, wherein T44 represents a temperature of a working gas detected at a discharge of a first turbine of the gas turbine engine or at an inlet of a second turbine of the gas turbine engine downstream from the first turbine;

T20 represents a detected inlet temperature of a second compressor of the gas turbine engine or a detected ambient temperature; and "B" represents an experimentally derived value corresponding to the gas turbine engine.

7. The method of claim 6, wherein the factor $(T44/T20)^B$ compensates the value for a variation in a wear condition of the gas turbine engine.

8. The method of claim 6, wherein the gas turbine engine includes two or more compressors, two or more turbines, and a controller; and wherein the method further includes:

monitoring of the operation of the gas turbine engine with the controller including one or more of:

changing a variable geometry of the gas turbine engine;

adjusting a fuel control valve of the gas turbine engine;

and providing an engine power indicator.

9. The method of claim 5, wherein the one or more adjustments include one or more of:

changing a variable geometry of the gas turbine engine;

controlling a fuel control valve of the gas turbine engine;

and changing an engine power indicator.

10. A method, comprising:

providing a gas turbine engine structured to provide mechanical shaft power;

sensing parameters relating to gas turbine engine operation;

calculating a signal representative of the shaft power provided by rotation of the shaft during the gas turbine engine operation, the calculating including mathematically interrogating a function of the parameters; and monitoring the gas turbine engine operation with the signal; and controlling the gas turbine engine operation in accordance with the signal;

wherein the function corresponds to the relationship $\theta^{-A} * (P1/P2) * (T1/T2)^B$;

wherein P1 corresponds to a first one of the parameters and represents a discharge pressure of a first compressor, P2 corresponds to a second one of the parameters and represents ambient pressure, T1 corresponds to a third one of the parameters and represents a turbine inlet temperature, T2 corresponds to a fourth one of the parameters and represents an inlet temperature of a second compressor, $\theta$ is a temperature compensation factor for temperature T2, and A and B are constants based on design of the gas turbine engine.

11. The method of claim 10, wherein $\theta$ is a function of T2 and a constant.

\* \* \* \* \*